(12) United States Patent
Liang et al.

(10) Patent No.: US 12,538,172 B2
(45) Date of Patent: Jan. 27, 2026

(54) PDCP DUPLICATION CONFIGURING, ACTIVATING, OR DEACTIVATING METHOD AND TERMINAL

(71) Applicant: VIVO MOBILE COMMUNICATION CO., LTD., Guangdong (CN)

(72) Inventors: Jing Liang, Guangdong (CN); Qian Zheng, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 379 days.

(21) Appl. No.: 18/302,988

(22) Filed: Apr. 19, 2023

(65) Prior Publication Data

US 2023/0262517 A1    Aug. 17, 2023

Related U.S. Application Data

(63) Continuation of application No. PCT/CN2021/126026, filed on Oct. 25, 2021.

(30) Foreign Application Priority Data

Oct. 28, 2020    (CN) .......................... 202011177351.1

(51) Int. Cl.
*H04W 28/06* (2009.01)
*H04W 28/02* (2009.01)
*H04W 80/02* (2009.01)

(52) U.S. Cl.
CPC ....... *H04W 28/06* (2013.01); *H04W 28/0273* (2013.01); *H04W 80/02* (2013.01)

(58) Field of Classification Search
None
See application file for complete search history.

(56) References Cited

U.S. PATENT DOCUMENTS

| 11,005,604 B2 * | 5/2021 | Pan ........................ H04W 76/15 |
| 12,245,075 B2 * | 3/2025 | Zheng ................... H04W 76/14 |
| 2019/0239112 A1 | 8/2019 | Rao et al. |

(Continued)

FOREIGN PATENT DOCUMENTS

| EP | 4017208 A1 * | 6/2022 | ........... H04L 1/1812 |
| JP | 2020526946 A | 8/2020 | |

(Continued)

OTHER PUBLICATIONS

Samsung, "Packet Duplication for the Sidelink Carrier Aggregation" 3GPP TSG-RAN WG2 Meeting #101 R2-1802599 Athens, Greece, Feb. 26-Mar. 2, 2018.

(Continued)

*Primary Examiner* — Anh Vu H Ly
(74) *Attorney, Agent, or Firm* — Perilla Knox & Hildebrandt LLP; Kenneth A. Knox

(57) ABSTRACT

The embodiments of the present application disclose a PDCP duplication configuring, activating, or deactivating method and a terminal. The method includes: receiving, by a terminal, a first message, where the first message is used to configure, activate, or deactivate PDCP duplication for a sidelink radio bearer SLRB of the terminal based on at least one of the following granularities: an SLRB, a destination address, a link, a radio link control RLC bearer or entity, and a terminal.

16 Claims, 4 Drawing Sheets

(56) References Cited

U.S. PATENT DOCUMENTS

| | | |
|---|---|---|
| 2020/0403731 A1 | 12/2020 | Zhang et al. |
| 2021/0219375 A1 | 7/2021 | Kim et al. |
| 2022/0015134 A1 | 1/2022 | Liang et al. |
| 2022/0022228 A1* | 1/2022 | Wang .................... H04W 72/20 |
| 2022/0377829 A1 | 11/2022 | Kim et al. |

FOREIGN PATENT DOCUMENTS

| | | |
|---|---|---|
| KR | 20200114968 A | 10/2020 |
| WO | 2020192672 A1 | 10/2020 |
| WO | 2020197259 A1 | 10/2020 |
| WO | 2020198336 A1 | 10/2020 |
| WO | 2020198687 A1 | 10/2020 |

OTHER PUBLICATIONS

Huawei, HiSilicon, "Discussion about sidelink LCP procedure" 3GPP TSG-RAN WG2#105-bis R2-1904086 Xi'an, China, Apr. 8-12, 2019.

Catt, "PDCP Duplication Configuration and Activation/Deactivation" 3GPP TSG-RAN WG2 Meeting #107bis R2-1912219 Chongqing, P. R. China, Oct. 14-18, 2019.

\* cited by examiner

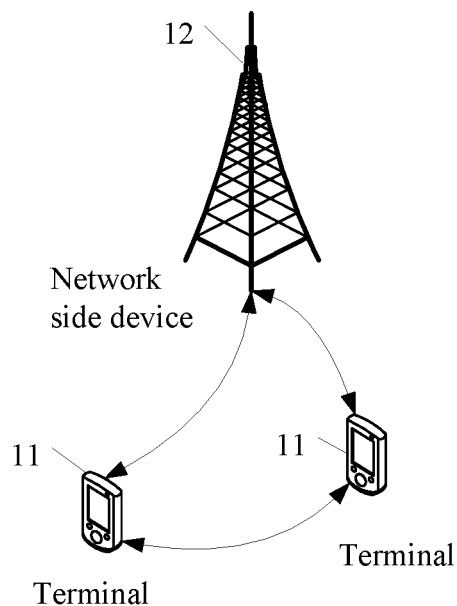
FIG. 1
200
A terminal receives a first message, where the first message is used to configure, activate, or deactivate PDCP duplication for an SLRB of the terminal based on at least one of the following granularities: an SLRB, a destination address, a link, a RLC bearer or entity, and a terminal ∽ S202
FIG. 2
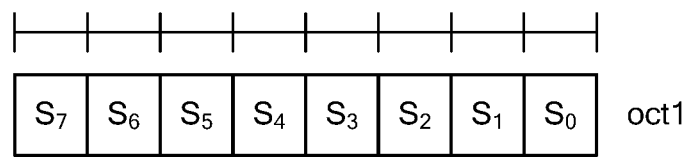
FIG. 3

PDCP DUPLICATION CONFIGURING, ACTIVATING, OR DEACTIVATING METHOD AND TERMINAL

CROSS-REFERENCE

This application is a continuation application of International Application No. PCT/CN2021/126026 filed on Oct. 25, 2021, which claims the priority of the Chinese patent application No. 202011177351.1 entitled "PDCP DUPLICATION CONFIGURING, ACTIVATING, OR DEACTIVATING METHOD AND TERMINAL" and filed in China on Oct. 28, 2020, the entire contents of which are incorporated in the present application by reference.

TECHNICAL FIELD

The present application belongs to the field of communication technologies, and specifically, relates to a packet data convergence protocol (PDCP) duplication configuring, activating, or deactivating method and a terminal.

BACKGROUND

A long term evolution (LTE) system supports sidelinks from the 12th release, which is used for direct data transmission between terminals without going through a network side device. Both Uu and sidelink of the LTE system support the PDCP duplication function, while in the new radio (NR) system, only the PDCP duplication function of Uu is currently supported, and the PDCP duplication function of the NR sidelink is not yet supported.

In the LTE system, it may be determined, based on a ProSe Per-Packet Reliability (PPPR) threshold of each sidelink data packet, whether to enable the PDCP duplication function, while each sidelink data packet in the NR system no longer has an independent PPPR attribute, and QoS management is performed through quality of service (QoS) flows. Therefore, in an NR sidelink, how to configure, activate, or deactivate PDCP duplication, and then use the PDCP duplication function to improve the reliability of data packet transmission and reduce the delay of retransmission is an urgent technical problem in the prior art.

SUMMARY

In a first aspect, a PDCP duplication configuring, activating, or deactivating method is provided. The method includes: receiving, by a terminal, a first message, where the first message is used to configure, activate, or deactivate PDCP duplication for an SLRB of the terminal based on at least one of the following granularities: an SLRB, a destination address, a link, a radio link control RLC bearer or entity, and a terminal.

In a second aspect, a terminal is provided, including: a receiving module, configured to receive a first message, where the first message is used to configure, activate, or deactivate PDCP duplication for an SLRB of the terminal based on at least one of the following granularities: an SLRB, a destination address, a link, a radio link control RLC bearer or entity, and a terminal.

In a third aspect, a terminal is provided. The terminal includes a processor, a memory, and a program or an instruction stored in the memory and executable on the processor. When the program or instruction is executed by the processor, the method in the first aspect is performed.

In a fourth aspect, a readable storage medium is provided, storing a program or an instruction. When the program or instruction is executed by the processor, the method in the first aspect is performed.

In a fifth aspect, a computer program product is provided. The computer program product includes a processor, a memory, and a program or an instruction stored in the memory and executable on the processor, where when the processor or the instruction is executed by the processor, the method in the first aspect is performed.

In a sixth aspect, a chip is provided, including a processor and a communication interface. The communication interface is coupled to the processor, and the processor is configured to run a program or an instruction to perform the method in the first aspect.

BRIEF DESCRIPTION OF DRAWINGS

FIG. 1 is a block diagram of a wireless communications system according to an embodiment of the present application;

FIG. 2 is a schematic flowchart of a PDCP duplication configuring, activating, or deactivating method according to an embodiment of the present application;

FIG. 3 is a schematic diagram of indicating activation or deactivation of PDCP duplication of an SLRB by a MAC CE through a bitmap indication according to an embodiment of the present application;

DESCRIPTION OF EMBODIMENTS

Figure 4:
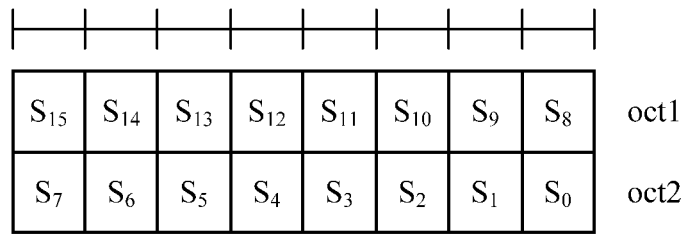
FIG. 4 is a schematic diagram of indicating activation or deactivation of PDCP duplication of an SLRB by a MAC CE through a bitmap indication according to another embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application shall fall within the protection scope of the present application.

The terms "first", "second", and the like in this specification and claims of the present application are used to distinguish between similar objects instead of describing a specific order or sequence. It should be understood that, data used in this way is interchangeable in proper circumstances, so that the embodiments of the present application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of the present application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of the present application may be used interchangeably. The described technologies can be applied to both the systems and the radio technologies mentioned above as well as to other systems and radio technologies. However, a new radio (NR) system is described in the following descriptions for illustrative purposes, and the NR terminology is used in most of the following descriptions, although these techniques can also be applied to applications other than the NR system application, for example, the 6th generation (6G) communications system.

FIG. 1 is a block diagram of a wireless communications system to which embodiments of the present application can be applied. The wireless communications system includes a terminal 11 and a network side device 12. The terminal 11 may be referred to as a terminal device or user equipment (UE). The terminal 11 may be a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), and pedestrian user equipment (PUE). The wearable device includes a bracelet, a headset, and glasses. It should be noted that a specific type of the terminal 11 is not limited in the embodiments of the present application. The network side device 12 may be a base station or a core network. A base station may be called a node B, an evolved node B, an access point, a base transceiver station (BTS), a radio base station, a radio transceiver, a basic service set (BSS), an extended service set (ESS), a Node B, an evolved Node B (eNB), a next-generation Node B (gNB), a home Node B, a home evolved Node B, a WLAN access point, a WiFi node, a transmitting and receiving point (TRP), or some other suitable term in the field, as long as the same technical effect is achieved. The base station is not limited to specific technical terms. It should be noted that in the embodiments of the present application, only the base station in the NR system is taken as an example, but the specific type of the base station is not limited.

The packet data convergence protocol (PDCP) duplication configuring, activating, or deactivating method and the terminal provided by the embodiments of the present application will be described below in detail in conjunction with the accompanying drawings through specific embodiments and application scenarios.

As shown in FIG. 2, an embodiment of the present application provides a PDCP duplication configuring, activating, or deactivating method 200. The method can be executed by a terminal. In other words, the method can be executed by software or hardware installed in the terminal. The method includes the following steps.

S202: The terminal receives a first message, where the first message is used to configure, activate or deactivate PDCP duplication for a sidelink radio bearer (SLRB) of the terminal based on at least one of the following granularities: an SLRB, a destination address, a link, a radio link control (RLC) bearer or entity, and a terminal.

The first message in this embodiment may be a radio resource control (RRC) message, and the RRC message may be used to configure, activate, or deactivate PDCP duplication for the SLRB of the terminal based on at least one of the above granularities.

The first message in this embodiment may also be a media access control control element (MAC CE) or downlink control information (DCI), and the MAC CE or DCI message may be used to activate or deactivate PDCP duplication for the SLRB of the terminal based on at least one of the above granularity.

The first message in this embodiment may come from the network side device. In this way, the network side device can configure, activate or deactivate the PDCP duplication for the SLRB of the terminal.

The first message in this embodiment may also come from a peer terminal. In this way, the peer terminal may configure, activate or deactivate PDCP duplication for the SLRB of the local terminal (that is, the terminal mentioned in S202). In this example, the peer terminal may be a transmitting terminal (TX UE), and the local terminal may be a receiving terminal (RX UE); or the peer terminal may be a receiving terminal (RX UE), and the local terminal may be a transmitting terminal (TX UE).

The PDCP duplication configuring, activating, or deactivating method provided by the embodiments of the present application can configure, activate, or deactivate PDCP duplication for the SLRB of the terminal based on at least one of the following granularities: an SLRB, a destination address, a link, an RLC bearer or entity, and a terminal. This provides an effective solution to the PDCP duplication function in the scenario such as NR sidelink, and improves the reliability of data packet transmission and reduce the delay of data packet retransmission through the PDCP duplication function.

In order to describe in detail the PDCP duplication configuring, activating, or deactivating method provided by the above-mentioned embodiments of the present application, the following description will be made in combination with several specific embodiments.

Embodiment 1

The first message in this embodiment includes a MAC CE, and the MAC CE is used to activate or deactivate the PDCP duplication for the SLRB of the terminal based on the granularity of the SLRB. That is, in this embodiment, the MAC CE (that is, the first message) may be used to activate or deactivate (per-SLRB activation or deactivation), based on the granularity of the SLRB, PDCP duplication for the SLRB configured by the terminal.

The MAC CE in this embodiment satisfies at least one of the following 1) to 8):

1) The MAC CE includes an SLRB identifier (ID), an index value, or a sequence value, and the MAC CE is used to activate or deactivate PDCP duplication for an SLRB corresponding to the SLRB ID, the index value, or the sequence value.

In this example, the ID, the index value (such as slrb-Uu-ConfigIndex) or the sequence value corresponding to the SLRB can be carried in the MAC CE, so as to activate or deactivate the corresponding SLRB.

In a specific implementation manner (hereinafter referred to as manner 1), the MAC CE includes the sequence value, and the MAC CE uses a bitmap indication to activate or deactivate PDCP duplication for the SLRB corresponding to the sequence value, where multiple SLRBs configured by the terminal are sorted according to a target sequence.

In another specific implementation manner (hereinafter referred to as manner 2), the MAC CE includes an SLRB ID or index value, and the MAC CE directly indicates the SLRB ID or index value to activate or deactivate PDCP duplication for an SLRB corresponding to the SLRB ID or index value.

In manner 1, all SLRBs configured with duplication can be sorted according to IDs or index values of the SLRBs, and then a bitmap is used to indicate whether an it SLRB is (PDCP duplication) activated or deactivated.

An example of manner 1 is shown in FIG. 3 and FIG. 4, FIG. 3 is a schematic diagram of one byte in the MAC CE, and FIG. 4 is a schematic diagram of two bytes in the MAC CE.

In the example shown in FIG. 3, the 8 SLRBs configured with PDCP duplication by the terminal are sorted in descending order according to the IDs or index values of the SLRB. In FIG. 3, $S_i$ indicates SLRB, where i can be 0 to 7.

In the example shown in FIG. 4, the 16 SLRBs configured with PDCP duplication by the terminal are sorted in descending order according to the IDs or index values of the SLRB. In FIG. 4, $S_i$ indicates SLRB, where i can be 0 to 15.

In the examples shown in FIG. 3 and FIG. 4, $S_i=1$ means activation and $S_i=0$ means deactivation; or $S_i=0$ means activation and $S_i=1$ means deactivation.

Figure 5:
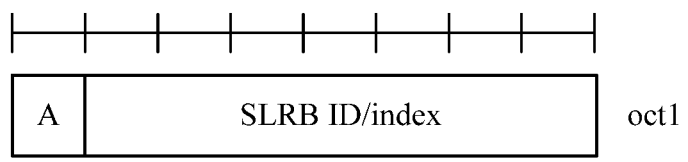
FIG. 5 is a schematic diagram of indicating activation or deactivation of PDCP duplication of an SLRB by a MAC CE by carrying an SLRB ID/index according to an embodiment of the present application.

In manner 2, the ID or index value corresponding to the SLRB may be directly indicated to activate or deactivate the SLRB. The example shown in manner 2 is shown in FIG. 5. FIG. 5 shows a schematic diagram of one byte in the MAC CE. The ID or index of the SLRB is directly carried in the MAC CE, and 1 bit is used at the front to indicate whether to activate or deactivate, for example, A=1 as shown in FIG. 5 indicates activation, and A=0 indicates deactivation; or A=0 indicates activation and A=1 indicates deactivation.

2) The MAC CE includes a transmission range or a transmission range threshold, and the MAC CE is used to activate or deactivate PDCP duplication for an SLRB satisfying the transmission range or the transmission range threshold.

In this example, the MAC CE carries the transmission range or the transmission range threshold corresponding to the SLRB, and PDCP duplication is activated or deactivated for an SLRB whose transmission range is equal to the transmission range indicated in the MAC CE or an SLRB whose transmission range satisfies the transmission range threshold indicated in the MAC CE.

3) The MAC CE is used to activate or deactivate PDCP duplication for a default SLRB.

In this example, the MAC CE indicates that the PDCP duplication is activated or deactivated for the default SLRB. Of course, in other examples, the MAC CE may also indicate that the PDCP duplication is activated or deactivated for a non-default SLRB.

4) The MAC CE includes a sidelink interface quality of service flow identifier (Sidelink interface Qos Flow ID, SLQFI or PC5 Qos Flow ID, PFI or PQFI), and the MAC CE is used to activate or deactivate PDCP duplication for an SLRB corresponding to the SLQFI or PFI.

In this example, the SLQFI or PFI is carried in the MAC CE, and PDCP duplication is activated or deactivated for an (or corresponding) SLRB to which the SLQFI or PFI is mapped.

5) The MAC CE includes a cast type, and the MAC CE is used to activate or deactivate PDCP duplication for an SLRB satisfying the cast type.

In this example, the cast type is carried in the MAC CE, and the PDCP duplication is activated or deactivated for an SLRB with the cast type configuration equal to the cast type indicated in the MAC CE. The above cast types include unicast, multicast, or broadcast.

6) The MAC CE includes a discard timer or a threshold of a discard timer, and the MAC CE is used to activate or deactivate PDCP duplication for an SLRB satisfying the discard timer or the threshold of a discard timer.

In this example, PDCP duplication is activated or deactivated for an SLRB whose discard timer configuration is equal to the discard timer indicated in the MAC CE; or PDCP duplication is activated or deactivated for an SLRB whose discard timer configuration satisfies the threshold of a discard timer indicated in the MAC CE.

Satisfying the threshold of a discard timer mentioned above may refer to being greater than or equal to the threshold; or less than or equal to the threshold.

7) The MAC CE includes a PDCP sequence number size (PDCP SN size), and the MAC CE is used to activate or deactivate PDCP duplication for an SLRB meeting the PDCP sequence number size.

In this example, the MAC CE carries the PDCP sequence number size, and PDCP duplication is activated or deactivated for an SLRB with the PDCP sequence number size configuration equal to the PDCP sequence number size indicated in the MAC CE.

The PDCP sequence number size mentioned in this example includes 12 bit, 18 bit or other newly defined sequence number sizes.

8) The MAC CE is used to activate or deactivate PDCP duplication for an SLRB that supports out-of-order delivery.

In this example, the MAC CE indicates that PDCP duplication is activated or deactivated for an SLRB that supports out-of-order delivery. Of course, in other examples, the MAC CE may also indicate that PDCP duplication is activated or deactivated for an SLRB that does not support out-of-order delivery.

It should be noted that any two or more factors in the above 1) to 8) may also be combined with an instruction, to activate or deactivate PDCP duplication for an SLRB whose configuration satisfies the requirement. For example, SLRB ID=x can be set, and PDCP duplication is activated or deactivated for a default SLRB, that is, a combination of 1) and 3). For another example, PDCP duplication is activated and deactivated for an SLRB whose sequence value is i=x and whose transmission range is smaller than the threshold y, that is, a combination of 1) and 2).

Embodiment 2

In this embodiment, PDCP duplication is activated or deactivated for the SLRB of the terminal based on the granularity of the destination address or link (per-destination or per link activation and deactivation).

The first message in this embodiment includes a MAC CE, and the MAC CE includes a destination address (destination) or a link identifier (link ID). When the MAC CE includes a destination address, the MAC CE is used to activate or deactivate PDCP duplication for the SLRB corresponding to the destination address; or when the MAC CE includes a link identifier, the MAC CE is used to activate or deactivate PDCP duplication for the SLRB corresponding to the link identifier.

Figure 6:
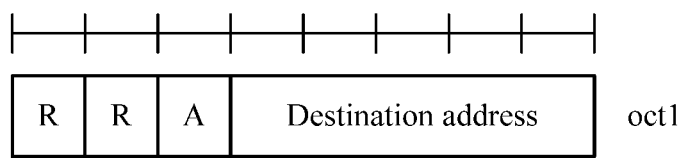
FIG. 6 is a schematic diagram of indicating activation or deactivation of PDCP duplication of an SLRB by a MAC CE by carrying a destination address according to an embodiment of the present application.

In an embodiment, the destination address is indicated in the MAC CE, and PDCP duplication is activated or deactivated for all SLRBs that establish connection with the destination address. The example shown in this implementation is shown in FIG. 6. FIG. 6 is a schematic diagram of one byte in the MAC CE. The R field in FIG. 6 indicates a reserved field, A=1 indicates activation and A=0 indicates deactivation; or A=0 means activation and A=1 means deactivation.

In another implementation, the link identifier is indicated in the MAC CE, and PDCP duplication is activated or deactivated for all SLRBs belonging to the link ID. The example shown in this implementation is shown in FIG. 7 or FIG. 8, and FIG. 7 and FIG. 8 are schematic diagrams of one byte in the MAC CE.

Figure 7:
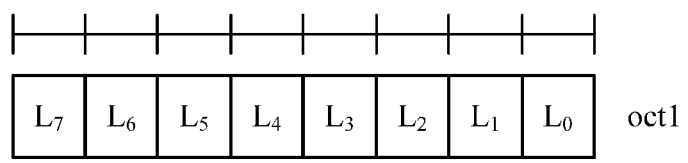
FIG. 7 is a schematic diagram of indicating activation or deactivation of PDCP duplication of an SLRB by a MAC CE by carrying a link identifier through a bitmap indication according to an embodiment of the present application.

In FIG. 7, Li represents Link ID=i and i=0 to 7, where Li=1 represents activation and Li=0 represents deactivation; or Li=0 represents activation and Li=1 represents deactivation.

Figure 8:
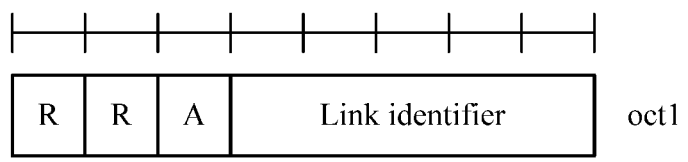
FIG. 8 is a schematic diagram of indicating activation or deactivation of PDCP duplication of an SLRB by a MAC CE by carrying a link identifier according to another embodiment of the present application.

The R field in FIG. 8 represents a reserved field, and A=1 represents activation and A=0 represents deactivation; or A=0 represents activation and A=1 represents deactivation.

Embodiment 3

The third embodiment is a combined embodiment of the second embodiment and the first embodiment.

In this embodiment, the destination address/link identifier is first determined, and then PDCP duplication is activated or deactivated per-SLRB based on one or more of the manners in 1) to 8) in Embodiment 1 for all SLRBs belonging to the destination address/link identifier. For example, the destination address is determined first, and then the activation or deactivation of the PDCP duplication is indicated based on the sequence value of the SLRB.

Figure 9:
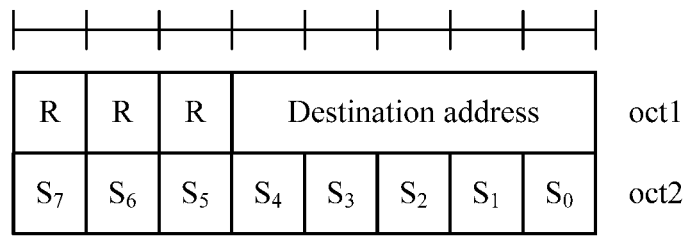
FIG. 9 is a schematic diagram of indicating activation or deactivation of PDCP duplication of an SLRB by a MAC CE by carrying a destination address through a bitmap indication according to an embodiment of the present application.

An example shown in this implementation manner is shown in FIG. 9, and FIG. 9 is a schematic diagram of two bytes in a MAC CE. The R field in FIG. 9 represents the reserved field. In the example shown in FIG. 9, the 8 SLRBs configured with PDCP duplication by the terminal are sorted in descending order according to the IDs or index values of the SLRB. In FIG. 9, $S_i$ represents SLRB, where i can be 0 to 7. In the example shown in FIG. 9, $S_i=1$ means activation and $S_i=0$ means deactivation; or $S_i=0$ means activation and $S_i=1$ means deactivation.

Embodiment 4

In this embodiment, based on the granularity of the RLC bearer or entity, PDCP duplication is activated or deactivated for the SLRB of the terminal (activation and deactivation of per RLC bearer/entity).

The first message in this embodiment is used to activate or deactivate at least one secondary RLC entity of the SLRB of the terminal.

Specifically, for each SLRB, the activation or deactivation of the secondary RLC entity may be directly indicated through the first message. In this embodiment, the secondary RLC entities may be sorted (in ascending or descending order) based on logical channel IDs, where $RLC_i$ represents the $i^{th}$ (in ascending or descending order) secondary RLC entity. $RLC_i=1$ indicates activation and $RLC_i=0$ indicates deactivation; or $RLC_i=0$ indicates activation and $RLC_i=1$ indicates deactivation.

Figure 10:
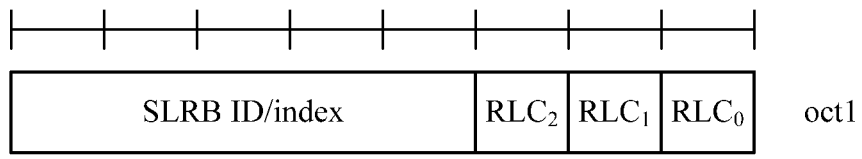
FIG. 10 is a schematic diagram of activating or deactivating a secondary RLC entity through a bitmap according to an embodiment of the present application.

As shown in FIG. 10, FIG. 10 is a schematic diagram of one byte in the MAC CE, and in the example shown in FIG. 10, the secondary RLC entities are sorted in descending order. Refer to $RLC_2$, $RLC_1$, and $RLC_0$. $RLC_i=1$ means activation and $RLC_i=0$ means deactivation; or $RLC_i=0$ means activation and $RLC_i=1$ means deactivation.

Embodiment 5

The first message in this embodiment is used to activate or deactivate PDCP duplication for the SLRB of the terminal based on the granularity of the terminal (per UE activation and deactivation).

In this embodiment, the network vehicle device can send 1 bit to the terminal through the DCI or the MAC CE to instruct the terminal to activate or deactivate all SLRBs configured with PDCP duplication.

Optionally, in the first to fifth embodiments above, the network side device may configure PDCP duplication based on reporting by the terminal, or activate/deactivate the PDCP duplication of the SLRB.

In this way, before the terminal in each of the foregoing embodiments receives the first message, the method further includes: sending, by the terminal, a second message, where the second message is used to request configuration, activation, or deactivation of PDCP duplication for the SLRB of the terminal.

Optionally, the second message includes terminal assistance information (UEAssistanceInformation) or sidelink terminal information (SidelinkUEInformation).

Optionally, the second message may include corresponding information at each granularity, such as the SLRBID, index value, or sequence value at the per-SLRB granularity, so that the second message may be used to request, from the network side device, a specific SLRB for which PDCP duplication is configured, activated, or deactivated. Specifically, the format of the second message may refer to the manners described in the foregoing embodiments 1 to 5, and a specific SLRB for which PDCP duplication is configured, activated, or deactivated is requested from the network side device.

In this embodiment, for example, the terminal carries the information in the above embodiments 1 to 5 in SidelinkUEInformation or UEAssistanceInformation, to indicate to the network side device that the terminal wishes to be configured with PDCP duplication, or to activate or deactivate the attribute corresponding to the SLRB of PDCP duplication. After receiving the information reported by the terminal, the network side device configures or activates or deactivates PDCP duplication for the SLRB corresponding to the terminal through the manners in Embodiment 1 to Embodiment 5.

In each of the foregoing embodiments, the network side device can configure PDCP duplication for the SLRB through RRC, and can configure as activation or deactivation (initial state), etc., where the configuration granularity can also be the granularity in embodiment 1 to embodiment 5. Subsequently, PDCP duplication can be activated or deactivated for the SLRB through MAC CE or DCI.

It should be noted that, the PDCP duplication configuring, activating, or deactivating method provided by the embodiments of the present application may be performed by a terminal, or a control module in the terminal configured to perform the PDCP duplication configuring, activating, or deactivating method. In the embodiments of the present application, an example in which the PDCP duplication configuring, activating, or deactivating method is performed by the terminal is used to describe the terminal provided in the embodiments of the present application.

Figure 11:
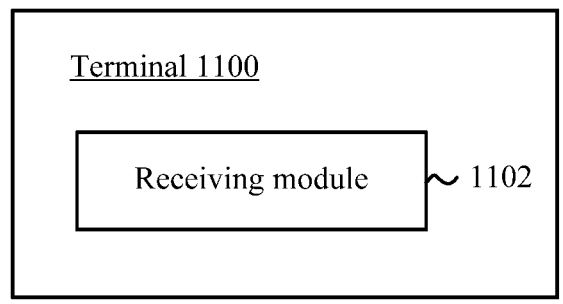
FIG. 11 is a schematic structural diagram of a terminal according to an embodiment of the present application.

FIG. 11 is a schematic structural diagram of a terminal according to an embodiment of the present application. As shown in FIG. 11, the terminal 1100 includes the following module:
- a receiving module 1102, configured to receive a first message, where the first message is used to configure, activate, or deactivate PDCP duplication for an SLRB of the terminal based on at least one of the following granularities: an SLRB, a destination address, a link, a RLC bearer or entity, and a terminal.

In the embodiments of the present application can configure, activate, or deactivate PDCP duplication for the SLRB of the terminal based on at least one of the following granularities: an SLRB, a destination address, a link, an RLC bearer or entity, and a terminal. This provides an effective solution to the PDCP duplication function in the scenario such as NR sidelink, and improves the reliability of data packet transmission and reduce the delay of data packet retransmission through the PDCP duplication function.

Optionally, as an embodiment, the terminal 1100 further includes a sending module, configured to send a second message, where the second message is used to request configuration, activation, or deactivation of PDCP duplication for the SLRB of the terminal.

Optionally, as an embodiment, the second message includes terminal assistance information or sidelink terminal information.

Optionally, as an embodiment, the first message in this embodiment includes a MAC CE, and the MAC CE is used to activate or deactivate the PDCP duplication for the SLRB of the terminal based on the granularity of the SLRB.

Optionally, as an embodiment, the MAC CE satisfies at least one of the following 1) to 8):

1) The MAC CE includes an SLRB identifier ID, an index value, or a sequence value, and the MAC CE is used to activate or deactivate PDCP duplication for an SLRB corresponding to the SLRB ID, the index value, or the sequence value.

2) The MAC CE includes a transmission range or a transmission range threshold, and the MAC CE is used to activate or deactivate PDCP duplication for an SLRB satisfying the transmission range or the transmission range threshold.

3) The MAC CE is used to activate or deactivate PDCP duplication for a default SLRB.

4) The MAC CE includes a sidelink interface quality of service flow identifier SLQFI or PFI, and the MAC CE is used to activate or deactivate PDCP duplication for an SLRB corresponding to the SLQFI or PFI.

5) The MAC CE includes a cast type, and the MAC CE is used to activate or deactivate PDCP duplication for an SLRB satisfying the cast type.

6) The MAC CE includes a discard timer or a threshold of a discard timer, and the MAC CE is used to activate or deactivate PDCP duplication for an SLRB satisfying the discard timer or the threshold of a discard timer.

7) The MAC CE includes a PDCP sequence number size, and the MAC CE is used to activate or deactivate PDCP duplication for an SLRB meeting the PDCP sequence number size.

8) The MAC CE is used to activate or deactivate PDCP duplication for an SLRB that supports out-of-order delivery.

Optionally, as an embodiment, the MAC CE includes the sequence value, and the MAC CE uses a bitmap indication to activate or deactivate PDCP duplication for the SLRB corresponding to the sequence value, where multiple SLRBs configured by the terminal are sorted according to a target sequence; or the MAC CE includes an SLRB ID or index value, and the MAC CE directly indicates the SLRB ID or index value to activate or deactivate PDCP duplication for an SLRB corresponding to the SLRB ID or index value.

Optionally, as an embodiment, the MAC CE includes a destination address or a link identifier; where the MAC CE is used to activate or deactivate PDCP duplication for an SLRB corresponding to the destination address; or the MAC CE is used to activate or deactivate PDCP duplication for an SLRB corresponding to the link identifier.

Optionally, as an embodiment, the first message is used to activate or deactivate at least one secondary RLC entity of the SLRB of the terminal.

Optionally, as an embodiment, the first message includes a radio resource control RRC message, and the RRC message is used to configure PDCP duplication for the SLRB of the terminal; and/or the first message includes a MAC CE or downlink control information DCI, and the MAC CE or DCI is used to activate or deactivate PDCP duplication for the SLRB of the terminal.

For the terminal 1100 according to the embodiments of the present application, refer to the procedure corresponding to the method 200 according to the embodiments of the present application. Furthermore, each unit/module of the terminal 1100 and the foregoing other operations and/or functions are used to implement the corresponding procedure of the method 200, and a same or equivalent technical effect can be achieved. For brevity, details are not described herein again.

The terminal in the embodiments of the present application may be an apparatus, or may be a component, an integrated circuit, or a chip in a terminal. The terminal may be a mobile terminal, or a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of the present application.

The terminal in this embodiment of the present application may be an apparatus with an operating system. The operating system may be an Android operating system, an iOS operating system, or another possible operating system. This is not specifically limited in this embodiment of the present application.

The terminal according to embodiments of the present disclosure can implement the processes in the method embodiments in FIG. 2 to FIG. 10, and achieve the same technical effect. To avoid duplication, details are not described herein again.

Figure 12:
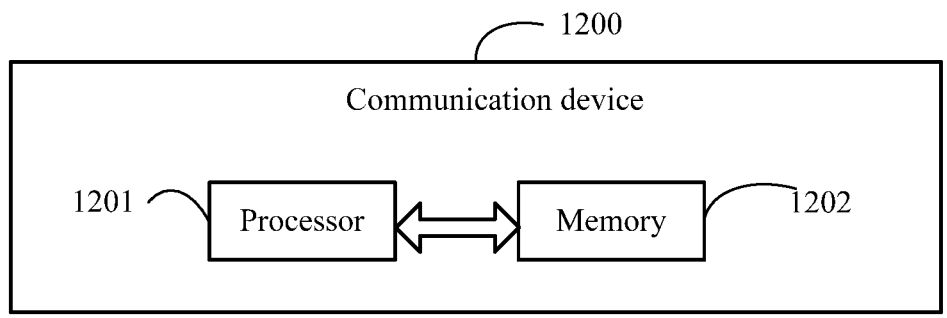
FIG. 12 is a schematic structural diagram of a communications device according to an embodiment of the present application.

Optionally, as shown in FIG. 12, this embodiment of the present application further provides a communication device 1200, including a processor 1201, a memory 1202, and a program or an instruction stored in the memory 1202 and executable on the processor 1201. For example, when the communication device 1200 is a terminal, when the program or instruction is executed by the processor 1201, each process of the above embodiment of the PDCP duplication configuring, activating, or deactivating method can be achieved, and the same technical effect can be achieved. In order to avoid repetition, details are not described herein.

Figure 13:
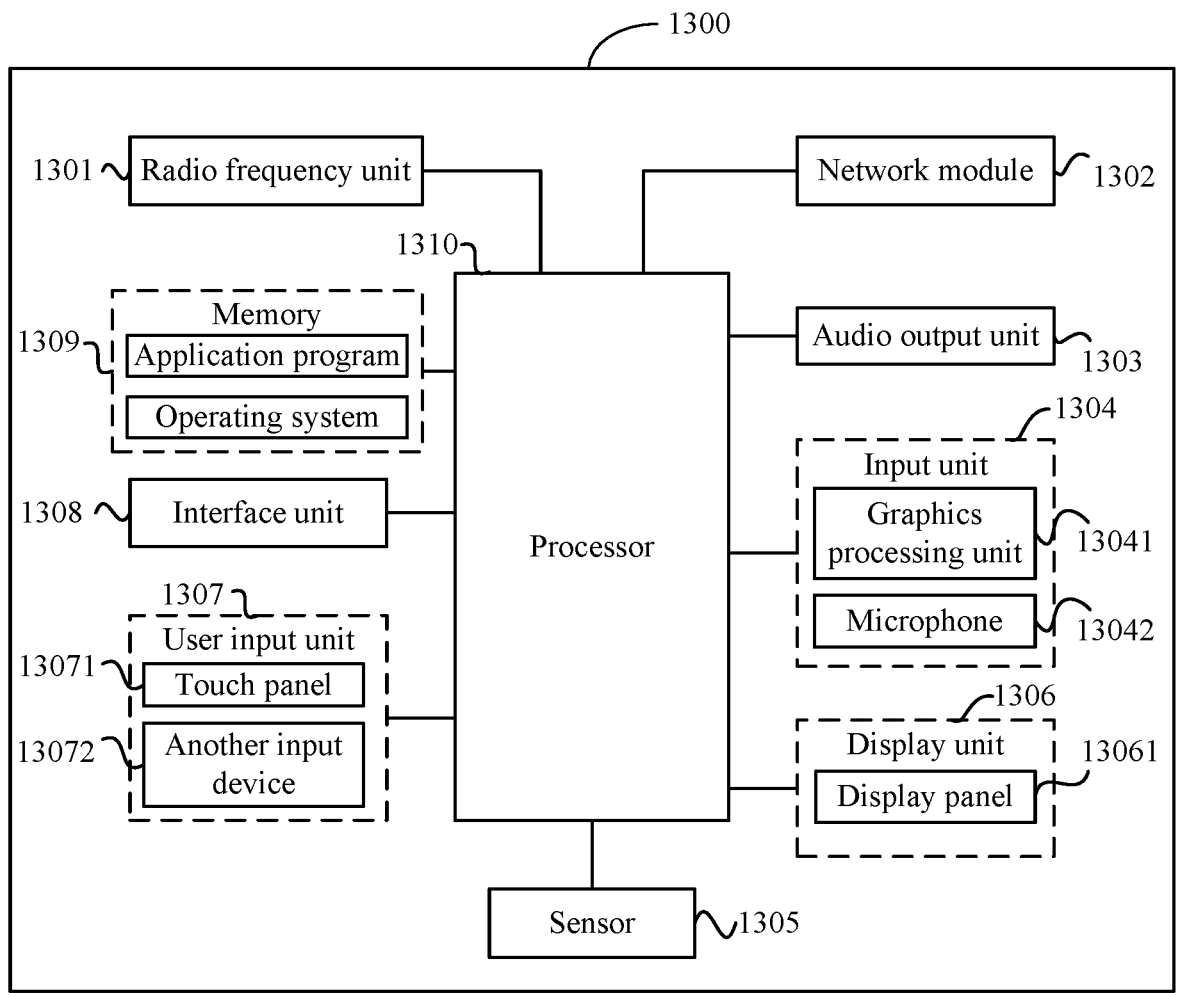
FIG. 13 is a schematic structural diagram of a terminal according to an embodiment of the present application.

FIG. 13 is a schematic diagram of a hardware structure of a terminal according to an embodiment of the present application.

A terminal 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

It may be understood by a person skilled in the art that the terminal 1300 may further include a power supply (such as a battery) that supplies power to each component. The power supply may be logically connected to the processor 1310 by using a power management system, to implement functions such as charging, discharging, and power consumption management by using the power management system. The terminal structure shown in FIG. 13 constitutes no limitation on the terminal, and the terminal may include more or fewer components than those shown in the figure, or combine some components, or have different component arrangements. Details are not described herein.

It should be understood that, in the embodiments of the present application, the input unit 1304 may include a graphics processing unit (GPU) 13041 and a microphone 13042, and the graphics processing unit 13041 processes image data of a still picture or video obtained by an image capture apparatus (such as a camera) in a video capture mode or an image capture mode. The display unit 1306 may include a display panel 13061. The display panel 13061 may be configured in a form such as a liquid crystal display or an organic light-emitting diode. The user input unit 1307 includes a touch panel 13071 and another input device 13072. The touch panel 13071 is also referred to as a touchscreen. The touch panel 13071 may include two parts: a touch detection apparatus and a touch controller. The another input device 13072 may include but is not limited to a physical keyboard, a functional button (such as a volume control button or a power on/off button), a trackball, a mouse, and a joystick. Details are not described herein.

In this embodiment of the present application, the radio frequency unit 1301 receives downlink data from a network side device and then sends the downlink data to the processor 1310 for processing; and sends uplink data to the network side device. Usually, the radio frequency unit 1301 includes but is not limited to an antenna, at least one amplifier, a transceiver, a coupler, a low noise amplifier, a duplexer, and the like.

The memory 1309 may be configured to store a software program or an instruction and various pieces of data. The memory 1309 may mainly include a program or instruction storage area and a data storage area. The program or instruction storage area may store an operating system, and an application program or an instruction required by at least one function (for example, a sound playing function or an image playing function). In addition, the memory 1309 may include a high-speed random access memory and non-volatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage component, a flash memory component, or another non-volatile solid-state storage component.

The processor 1310 may include one or more processing units. Optionally, an application processor and a modem processor may be integrated into the processor 1310. The application processor mainly processes an operating system, a user interface, an application, an instruction, or the like. The modem processor mainly processes wireless communications, for example, a baseband processor. It can be understood that, alternatively, the modem processor may not be integrated into the processor 1310.

The radio frequency unit 1301 is configured to receive a first message, where the first message is used to configure, activate, or deactivate PDCP duplication for a sidelink radio bearer SLRB of the terminal based on at least one of the following granularities: an SLRB, a destination address, a link, a radio link control RLC bearer or entity, and a terminal.

In the embodiments of the present application can configure, activate, or deactivate PDCP duplication for the SLRB of the terminal based on at least one of the following granularities: an SLRB, a destination address, a link, an RLC bearer or entity, and a terminal. This provides an effective solution to the PDCP duplication function in the scenario such as NR sidelink, and improves the reliability of data packet transmission and reduce the delay of data packet retransmission through the PDCP duplication function.

The terminal 1300 provided in this embodiment of the present application can also implement each process of the above embodiment of the PDCP duplication configuring, activating, or deactivating method, and can achieve the same technical effect. To avoid duplication, details are not repeated herein.

An embodiment of the present application further provides a readable storage medium. The readable storage medium may be volatile or non-volatile, and stores a program or an instruction, and when the program or the instruction is executed by a processor, each process of the embodiment of the PDCP duplication configuring, activating, or deactivating method is performed and the same technical effects can be achieved. To avoid duplication, details are not described herein again.

The processor is the processor in the terminal described in the above embodiment. The readable storage medium includes a computer-readable storage medium such as a computer read-only memory (ROM), a random access memory (RAM), a magnetic disk, an optical disc, or the like.

An embodiment of the present application further provides a chip, the chip includes a processor and a communication interface, the communication interface is coupled to the processor, and the processor is configured to run programs or instructions to implement each process of the embodiment of the PDCP duplication configuring, activating, or deactivating method and the same technical effects can be achieved. To avoid duplication, details are not described herein again.

It should be understood that the chip mentioned in this embodiment of the present application may also be referred to as a system-level chip, a system chip, a chip system, or an on-chip system chip.

The embodiments of the present application further provide a computer program product, the computer program product is stored in a non-transitory memory, and the computer program product is executed by at least one processor to implement various processes of the embodiment of the PDCP duplication configuring, activating, or deactivating methodcan, and can achieve the same technical effect. To avoid repetition, details are not repeated herein.

The embodiments of the present application further provide a communication device, configured to implement each process of the above embodiment of the PDCP duplication configuring, activating, or deactivating method, and can achieve the same technical effect. To avoid duplication, details are not repeated herein.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present application.

The embodiments of the present application are described above with reference to the accompanying drawings, but the present application is not limited to the foregoing specific implementation manners. The foregoing specific implementation manners are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. A Packet Data Convergence Protocol (PDCP) duplication configuring, activating, or deactivating method, the method comprising:
receiving, by a terminal, a first message, wherein the first message is used to configure, activate, or deactivate PDCP duplication for a Sidelink Radio Bearer (SLRB) of the terminal based on at least one of the following granularities: an SLRB, a destination address, a link, a Radio Link Control (RLC) bearer or entity, and a terminal;
wherein the first message comprises a Media Access Control Control Element (MAC CE), the MAC CE comprises a destination address or a link identifier, and the MAC CE is used to activate or deactivate PDCP duplication for an SLRB corresponding to the destination address or the link identifier.

2. The method according to claim 1, wherein before the terminal receives the first message, the method further comprises: sending, by the terminal, a second message, wherein the second message is used to request configuration, activation, or deactivation of PDCP duplication for the SLRB of the terminal.

3. The method according to claim 2, wherein the second message comprises terminal assistance information or sidelink terminal information.

4. The method according to claim 1, wherein the MAC CE is used to activate or deactivate PDCP duplication for the SLRB of the terminal based on a granularity of the SLRB.

5. The method according to claim 4, wherein the MAC CE satisfies at least one of the following:
the MAC CE comprises an SLRB identifier ID, an index value, or a sequence value, and the MAC CE is used to activate or deactivate PDCP duplication for an SLRB corresponding to the SLRB ID, the index value, or the sequence value;
the MAC CE comprises a transmission range or a transmission range threshold, and the MAC CE is used to activate or deactivate PDCP duplication for an SLRB satisfying the transmission range or the transmission range threshold;
the MAC CE is used to activate or deactivate PDCP duplication for a default SLRB;
the MAC CE comprises a sidelink interface quality of service flow identifier, and the MAC CE is used to activate or deactivate PDCP duplication for an SLRB corresponding to the sidelink interface quality of service flow identifier;
the MAC CE comprises a type of a cast, and the MAC CE is used to activate or deactivate PDCP duplication for an SLRB satisfying the type of the cast;
the MAC CE comprises a discard timer or a threshold of a discard timer, and the MAC CE is used to activate or deactivate PDCP duplication for an SLRB satisfying the discard timer or the threshold of a discard timer;
the MAC CE comprises a PDCP sequence number size, and the MAC CE is used to activate or deactivate PDCP duplication for an SLRB meeting the PDCP sequence number size; and
the MAC CE is used to activate or deactivate PDCP duplication for an SLRB that supports out-of-order delivery.

6. The method according to claim 5, wherein
the MAC CE comprises the sequence value, and the MAC CE uses a bitmap indication to activate or deactivate PDCP duplication for the SLRB corresponding to the sequence value, wherein multiple SLRBs configured by the terminal are sorted according to a target sequence; or the MAC CE comprises an SLRB ID or index value, and the MAC CE directly indicates the SLRB ID or index value to activate or deactivate PDCP duplication for an SLRB corresponding to the SLRB ID or index value.

7. The method according to claim 1, wherein the first message is used to activate or deactivate at least one secondary RLC entity of the SLRB of the terminal.

8. A terminal, comprising:
at least one hardware processor, a memory, and a program or an instruction stored in the memory and executable by the at least one hardware processor that, when executed, direct the at least one hardware processor to:
receive a first message, wherein the first message is used to configure, activate, or deactivate Packet Data Convergence Protocol (PDCP) duplication for a Sidelink Radio Bearer (SLRB) of the terminal based on at least one of the following granularities: an SLRB, a destination address, a link, a Radio Link Control (RLC) bearer or entity, and a terminal;
wherein the first message comprises a Media Access Control Control Element (MAC CE), the MAC CE comprises a destination address or a link identifier, and the MAC CE is used to activate or deactivate PDCP duplication for an SLRB corresponding to the destination address or the link identifier.

9. The terminal according to claim 8, wherein the at least one hardware processor is further directed to: sending a second message, wherein the second message is used to request configuration, activation, or deactivation of PDCP duplication for the SLRB of the terminal.

10. The terminal according to claim 9, wherein the second message comprises terminal assistance information or sidelink terminal information.

11. The terminal according to claim 8, wherein the MAC CE is used to activate or deactivate PDCP duplication for the SLRB of the terminal based on a granularity of the SLRB.

12. The terminal according to claim 11, wherein the MAC CE satisfies at least one of the following:
the MAC CE comprises an SLRB identifier ID, an index value, or a sequence value, and the MAC CE is used to activate or deactivate PDCP duplication for an SLRB corresponding to the SLRB ID, the index value, or the sequence value;
the MAC CE comprises a transmission range or a transmission range threshold, and the MAC CE is used to activate or deactivate PDCP duplication for an SLRB satisfying the transmission range or the transmission range threshold;
the MAC CE is used to activate or deactivate PDCP duplication for a default SLRB;
the MAC CE comprises a sidelink interface quality of service flow identifier, and the MAC CE is used to activate or deactivate PDCP duplication for an SLRB corresponding to the sidelink interface quality of service flow identifier;
the MAC CE comprises a type of a cast, and the MAC CE is used to activate or deactivate PDCP duplication for an SLRB satisfying the type of the cast;
the MAC CE comprises a discard timer or a threshold of a discard timer, and the MAC CE is used to activate or deactivate PDCP duplication for an SLRB satisfying the discard timer or the threshold of a discard timer;
the MAC CE comprises a PDCP sequence number size, and the MAC CE is used to activate or deactivate PDCP duplication for an SLRB meeting the PDCP sequence number size; and
the MAC CE is used to activate or deactivate PDCP duplication for an SLRB that supports out-of-order delivery.

13. The terminal according to claim 12, wherein
the MAC CE comprises the sequence value, and the MAC CE uses a bitmap indication to activate or deactivate PDCP duplication for the SLRB corresponding to the sequence value, wherein multiple SLRBs configured by the terminal are sorted according to a target sequence; or the MAC CE comprises an SLRB ID or index value, and the MAC CE directly indicates the SLRB ID or index value to activate or deactivate PDCP duplication for an SLRB corresponding to the SLRB ID or index value.

14. The terminal according to claim 8, wherein the first message is used to activate or deactivate at least one secondary RLC entity of the SLRB of the terminal.

15. A non-transitory computer-readable storage medium, storing a program or an instruction executable by at least one hardware processor, that, when executed by the at least one hardware processor, directs the at least one hardware processor to implement a Packet Data Convergence Protocol (PDCP) duplication configuring, activating, or deactivating method, comprising:
receiving a first message, wherein the first message is used to configure, activate, or deactivate PDCP duplication for a Sidelink Radio Bearer (SLRB) of the terminal based on at least one of the following granularities: an SLRB, a destination address, a link, a Radio Link Control (RLC) bearer or entity, and a terminal;
wherein the first message comprises a Media Access Control Control Element (MAC CE), the MAC CE comprises a destination address or a link identifier, and the MAC CE is used to activate or deactivate PDCP duplication for an SLRB corresponding to the destination address or the link identifier.

16. A chip, comprising at least one hardware processor and a communication interface, wherein the communication interface is coupled to the at least one hardware processor, and the at least one hardware processor is configured to run a program or an instruction stored in memory to implement the PDCP duplication configuring, activating, or deactivating method according to claim 1.

* * * * *